US010943175B2

(12) United States Patent
Sheppard et al.

(10) Patent No.: US 10,943,175 B2
(45) Date of Patent: Mar. 9, 2021

(54) METHODS, SYSTEMS AND APPARATUS TO IMPROVE MULTI-DEMOGRAPHIC MODELING EFFICIENCY

(71) Applicant: The Nielsen Company (US), LLC, New York, NY (US)

(72) Inventors: Michael Sheppard, Holland, MI (US); Ludo Daemen, Duffel (BE); Xiaoqi Cui, Darien, IL (US)

(73) Assignee: The Nielsen Company (US), LLC, New York, NY (US)

( * ) Notice: Subject to any disclaimer, the term of this patent is extended or adjusted under 35 U.S.C. 154(b) by 928 days.

(21) Appl. No.: 15/359,971

(22) Filed: Nov. 23, 2016

(65) Prior Publication Data
US 2018/0144267 A1 May 24, 2018

(51) Int. Cl.
*G06N 7/00* (2006.01)
*G06Q 30/02* (2012.01)

(52) U.S. Cl.
CPC ......... *G06N 7/005* (2013.01); *G06Q 30/0201* (2013.01)

(58) Field of Classification Search
CPC .............................. G06N 7/005; G06Q 30/0201
See application file for complete search history.

(56) References Cited

U.S. PATENT DOCUMENTS

| 8,739,197 | B1 | 5/2014 | Pecjak et al. |
| 9,277,265 | B2 | 3/2016 | Wood et al. |
| 2007/0011039 | A1* | 1/2007 | Oddo .................... G06F 21/316 |
| | | | 705/7.33 |
| 2008/0300965 | A1 | 12/2008 | Doe |
| 2012/0260278 | A1 | 10/2012 | Lambert et al. |
| 2014/0324544 | A1 | 10/2014 | Donato et al. |
| 2015/0112812 | A1* | 4/2015 | Weinsberg ............... G06N 5/00 |
| | | | 705/14.66 |
| 2018/0082325 | A1* | 3/2018 | Kitts .................. G06Q 30/0242 |

OTHER PUBLICATIONS

Jian Hu, "Demographic Prediction Based on User's Browsing Behavior", 2007, WWW (Year: 2007).*
(Continued)

*Primary Examiner* — Benjamin P Geib
(74) *Attorney, Agent, or Firm* — Hanley, Flight & Zimmerman, LLC

(57) ABSTRACT

Methods, apparatus, systems and articles of manufacture are disclosed to improve multi-demographic modeling efficiency. An example apparatus includes a feature set aggregator to segregate training data based on feature sets of interest, and to identify households that participate in at least one of the feature sets of interest, a class enumerator to reduce multi-demographic model iterations by enumerating demographic combinations for the identified households, the enumerated demographic combinations including a single identifier to represent a combination of two or more demographic categories, and a modeling engine to generate training coefficients associated with respective ones of the enumerated demographic combinations.

20 Claims, 9 Drawing Sheets

(56) References Cited

OTHER PUBLICATIONS

Anonymous, "Experian," Wikipedia, last modified Nov. 1, 2016, retrieved from <https://en.wikipedia.org/w/index.php?title=Experian&oldid=747322902>, retrieved on Nov. 1, 2016, 7 pages.
Anonymous, "How to deal with non-binary categorical variables in logistic regression (SPSS)," Cross Validated, retrieved from <http://stats.stackexchange.com/questions/3386/how-to-deal-with-non-bina . . . >, retrieved on May 12, 2016, 2 pages.
Karen, "Logistic Regression Models for Multinomial and Ordinal Variables," The Analysis Factor, 2008-2016, retrieved from <http://theanalysisfactor.com/logistic-regression-models-for-multino . . . >, retrieved on May 12, 2016, 15 pages.
Stockburger, "Multiple Regression with Categorical Variables," Multivariate Statistics: Concepts, Models, and Applications, retrieved from <http://www.psychstat.missouristate.edu/multibook/mlt08m.html>, retrieved on May 12, 2016, 23 pages.

* cited by examiner

FIG. 3

| HH | FEATURE | | | | | D1 | D2 | CLASS |
|---|---|---|---|---|---|---|---|---|
| | 1 | 2 | 3 | 4 | 5 | | | |
| 1 | 10 | 4 | 8 | 5 | 5 | 1 | 2 | A |
| 2 | 5 | 3 | 4 | 6 | 5 | 0 | 2 | B |
| 3 | 6 | 10 | 7 | 10 | 0 | 0 | 3 | C |
| 4 | 10 | 2 | 7 | 7 | 8 | 1 | 0 | D |
| 5 | 1 | 8 | 4 | 4 | 5 | 3 | 3 | E |
| 6 | 10 | 7 | 7 | 3 | 2 | 2 | 0 | F |
| 7 | 3 | 4 | 8 | 0 | 8 | 2 | 0 | F |
| 8 | 9 | 2 | 9 | 6 | 5 | 2 | 2 | G |
| 9 | 7 | 5 | 0 | 10 | 3 | 0 | 1 | H |
| 10 | 9 | 7 | 0 | 8 | 10 | 3 | 3 | E |
| ... | ... | ... | ... | ... | ... | ... | ... | ... |

(e.g., from the Truth Data Store 106)

Classes $\underline{A}$ through $\underline{M}$ = 13 unique combinations (2,1) → Never occurs (3,0) → Never occurs

FIG. 4

| HH | FEATURE 1-5 | THIRD PARTY MODEL 408B | | TRAINING MODEL 408A | | 412A 450 | | | | THIRD PARTY MODEL D1 | D2 | TRAINING MODEL D1 | D2 |
|---|---|---|---|---|---|---|---|---|---|---|---|---|---|
| | | D1 | D2 | D1 | D2 | (0,1)(0,1) | (0,1)(1,0) | (0,1)(1,1) ... | (1,1)(1,1) | | | | |
| 1 | ... | 1 | 0 | 1 | 0 | 0.53 | 0.00 | 0.00 | 0.18 | 0.47 | 0.73 | 0.45 | 0.85 |
| 2 | ... | 0 | 1 | 0 | 1 | 0.28 | 0.00 | 0.03 | 0.28 | 0.69 | 0.61 | 0.71 | 0.63 |
| 3 | ... | 1 | 0 | 1 | 0 | 0.54 | 0.00 | 0.00 | 0.17 | 0.46 | 0.77 | 0.40 | 0.81 |
| 4 | ... | 0 | 1 | 0 | 1 | 0.43 | 0.00 | 0.06 | 0.08 | 0.57 | 0.83 | 0.25 | 0.89 |
| 5 | ... | 0 | 1 | 0 | 1 | 0.16 | 0.00 | 0.00 | 0.51 | 0.78 | 0.73 | 0.84 | 0.75 |
| 6 | ... | 0 | 1 | 0 | 1 | 0.17 | 0.00 | 0.03 | 0.08 | 0.24 | 0.85 | 0.83 | 0.36 |
| 7 | ... | 1 | 1 | 1 | 1 | 0.28 | 0.00 | 0.00 | 0.48 | 0.69 | 0.80 | 0.71 | 0.92 |
| 8 | ... | 1 | 1 | 1 | 1 | 0.52 | 0.00 | 0.02 | 0.16 | 0.48 | 0.80 | 0.36 | 0.85 |
| 9 | ... | 1 | 0 | 1 | 0 | 0.23 | 0.00 | 0.00 | 0.13 | 0.75 | 0.40 | 0.74 | 0.42 |
| 10 | ... | 1 | 1 | 1 | 1 | 0.44 | 0.00 | 0.00 | 0.10 | 0.55 | 0.60 | 0.50 | 0.77 |
| ... | ... | ... | ... | ... | ... | ... | ... | ... | ... | ... | ... | ... | ... |

(e.g., from the Test Data Store 108)

(e.g., from the Truth Data Store 106)

METHODS, SYSTEMS AND APPARATUS TO IMPROVE MULTI-DEMOGRAPHIC MODELING EFFICIENCY

FIELD OF THE DISCLOSURE

This disclosure relates generally to demographic modeling, and, more particularly, to methods, systems and apparatus to improve multi-demographic modeling efficiency.

BACKGROUND

In recent years, marketing analysts have applied modeling techniques to determine household demographic compositions. Such modeling techniques operate on one or more types of available data sources, such as survey data and panelist data, the latter of which includes a degree of measurement accuracy that can be used for predictions and/or projections that meet expectations of statistical significance.

BRIEF DESCRIPTION OF THE DRAWINGS

FIG. 3 is an example training data set analyzed by the example demographic modeling system of FIG. 1 to estimate household demographic information with household member count demographic indicators.

FIG. 4 is an example training data set analyzed by the example demographic modeling system of FIG. 1 to estimate household demographic information in connection with third party models.

DETAILED DESCRIPTION

Figure 1:
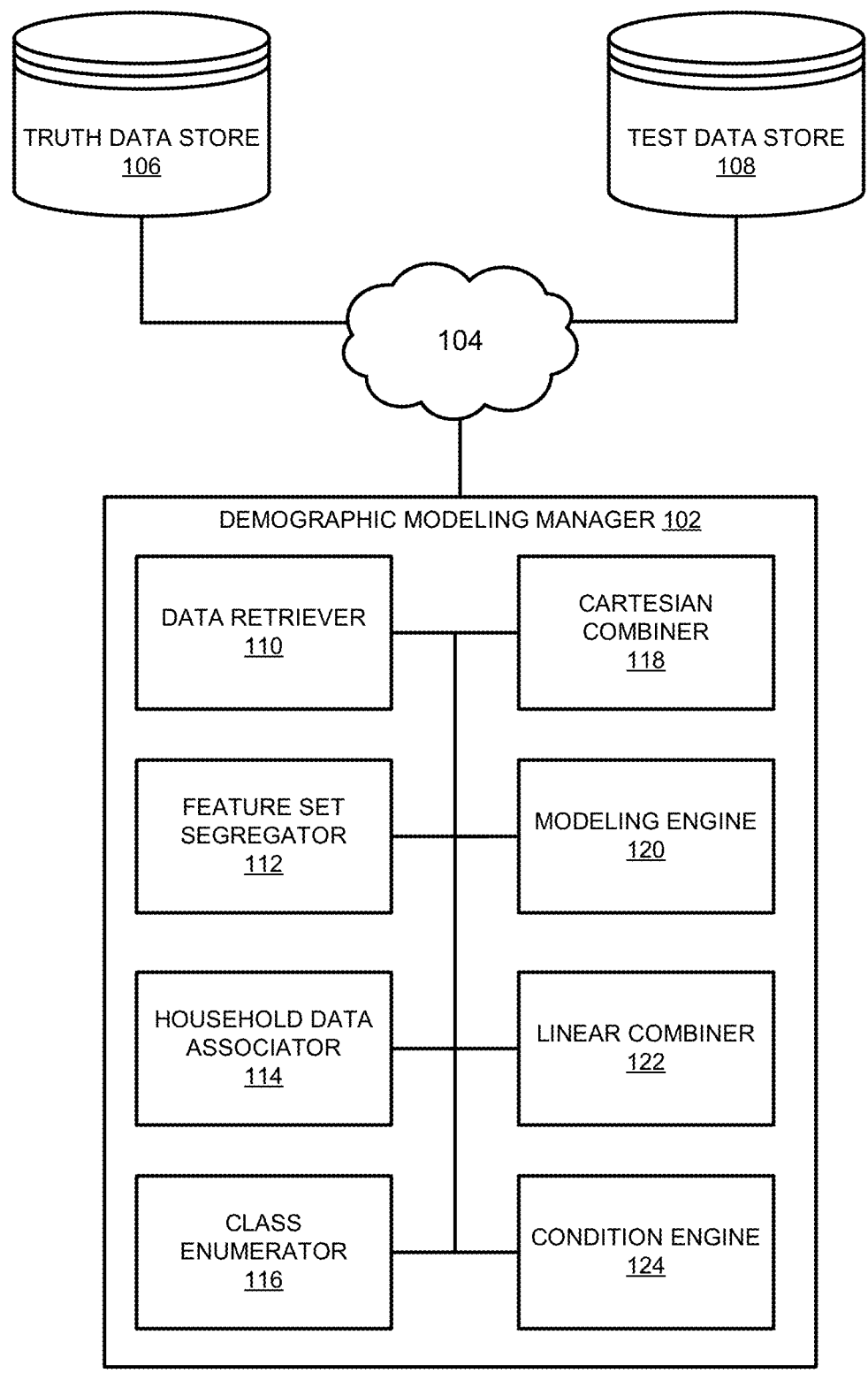
FIG. 1 is a schematic illustration of a demographic modeling system constructed in accordance with the teachings of this disclosure to improve multi-demographic modeling efficiency.

Marketing analysts may estimate household demographic compositions based on viewing data. For example, by applying retrieved and/or otherwise receiving viewing data (e.g., from panelist households), models may be applied to determine the presence or absence of a particular demographic of interest within households of interest. While such modeling efforts reveal valuable demographic insight for the demographic of interest for a particular household, the analyst must then re-run another model for other demographics of interest in a demographic-by-demographic manner. In some examples, marketing analysts seek household demographic information for many different demographic categories of interest that are typically found in households. For instance, some households include two parents and one or more children, which requires modeling analysis for (a) the female (mother) of the household for any number of age categories (e.g., 19-23, 24-27, 28-31, etc.), the male (father) of the household for any number of (similar) age categories, and (c) the one or more children for any number of age categories (e.g., 0-6 months, 7 months-1 year, 2-5, 6-9, etc.). For each household member, a separate model is typically executed to determine demographic details for each candidate age category of interest. Accordingly, for even a relatively small number of household members, multiple modeling iterations are required to obtain demographic estimations in view of the viewing data.

Additionally, after any number of modeling iterations occur for each candidate member of a household to determine individual demographics of that household, the analyst must also perform additional modeling efforts to identify potential correlation effects. As such, modeling processing requirements dramatically increase as a number of household members increases.

Methods, systems, apparatus and articles of manufacture disclosed herein improve multi-demographic modeling efficiency. Unlike traditional approaches to estimate demographics with viewer data with model iterations for (a) each demographic of interest and (b) combining the model iterations with collinearity modeling iteration(s) and/or correction efforts, examples disclosed herein apply a single truth model to the viewer data to generate truth coefficients for classes of demographic combinations. Examples disclosed herein model the classes one time to allow test data to be applied to the model to determine corresponding demographic probabilities for demographics of interest without requiring individualized models to be calculated and/or otherwise applied for each demographic of interest. As such, examples disclosed herein facilitate technical benefits including, but not limited to, reducing a number of computational models applied during marketing research, and reducing an amount of computational resource utilization during marketing research efforts. By reducing an application of numerous models and/or modeling iterations on a demographic-by-demographic manner, examples disclosed herein improve computational efficiency (e.g., reduce or minimize needed computational resources) as well as improve marketing analyst efficiency (e.g., reduce or minimize an amount of time preparing a marketing model) when performing marketing research.

FIG. 1 is a schematic illustration of a demographic modeling system 100. In the illustrated example of FIG. 1, the demographic modeling system 100 includes a demographic modeling manager 102 communicatively connected to one or more network(s) 104 that is/are communicatively connected to a truth data store 106 and a test data store 108. The example truth data store 106 includes panelist data of viewing behavior in which a detailed household composition is known. In some examples, household viewing behaviors stored in the example truth data store 106 include tuning behavior data (e.g., channel tuned, channel change data, duration (e.g., in minutes) of channel viewing, etc.) associated with set-top-boxes (STBs). Additionally, the example tuning behavior data is associated with household demographics (e.g., number of household members, household member age information, household member gender information, household member income information, etc.). In some examples, the tuning behavior is derived from panelist households with a PeopleMeter® (PM) metering device installed by an audience measurement entity (e.g., The Nielsen Company (US), LLC, Experian, etc.) that monitors media exposure data (e.g., viewing data, listening data, gaming activity, etc.) of an enlisted audience. Audience measurement typically involves determining the identity of the media being displayed and/or otherwise consumed on a media presentation device (e.g., a television), determining demographic information of an audience, and/or determining which members of a household are to be associated with exposure to particular media. Some audience measurement systems physically connect to the media presentation device, such as the television, to identify which channel is being tuned or which program is tuned by capturing a channel number, audio signatures and/or codes identifying (directly or indirectly) the programming being displayed by the media presentation device. Additionally, some audience measurement systems prompt and/or accept audience member input to reveal which household member is currently exposed to the media presented by the media presentation device.

The example test data store 108 includes audience viewing behavior information from one or more other sources, some of which may not be managed to a statistical rigor expected by panelist data sources. In some examples, the audience viewing behavior information stored in the test data store 108 is devoid of associated demographic information, but does include tuning behavior information. In still other examples, the audience viewing behavior information stored in the test data store 108 includes third party models of demographic viewing behavior. Some such third party models may be developed by audience measurement entities and/or personnel unassociated with the market analyst using the example demographic modeling system 100 of FIG. 1. However, some such third party models may have particular strengths and/or capabilities for accurately predicting, projecting and/or otherwise estimating viewing behaviors for particular demographics. As described in further detail below, example third party models stored in the example test data store 108 may be applied to examples disclosed herein to derive model corrections of one or more models generated by the example demographic modeling manager 102.

The example demographic modeling manager 102 of FIG. 1 also includes an example data retriever 110, an example feature set segregator 112, an example household data associator 114, an example class enumerator 116, an example Cartesian combiner 118, an example modeling engine 120, an example linear combiner 122 and an example condition engine 124. In operation, the example data retriever 110 retrieves training data from the example truth data store 106. The training data may be associated with viewership data and associated demographic information from a geography of interest. In some examples, the marketing analyst is interested in understanding demographic information associated with one or more particular features of the viewing audience, such as one or more particular programs that have been tuned by and/or otherwise consumed by audience members. Example features include, but are not limited to particular programs of interest (e.g., broadcast news programs, situational comedies), particular movies of interest, particular songs, etc. Depending on the features of interest selected by the marketing analyst, the example feature set segregator 112 segregates the retrieved training data, and identifies households that include such activity, as shown in the illustrated example of FIG. 2.

Figure 2:
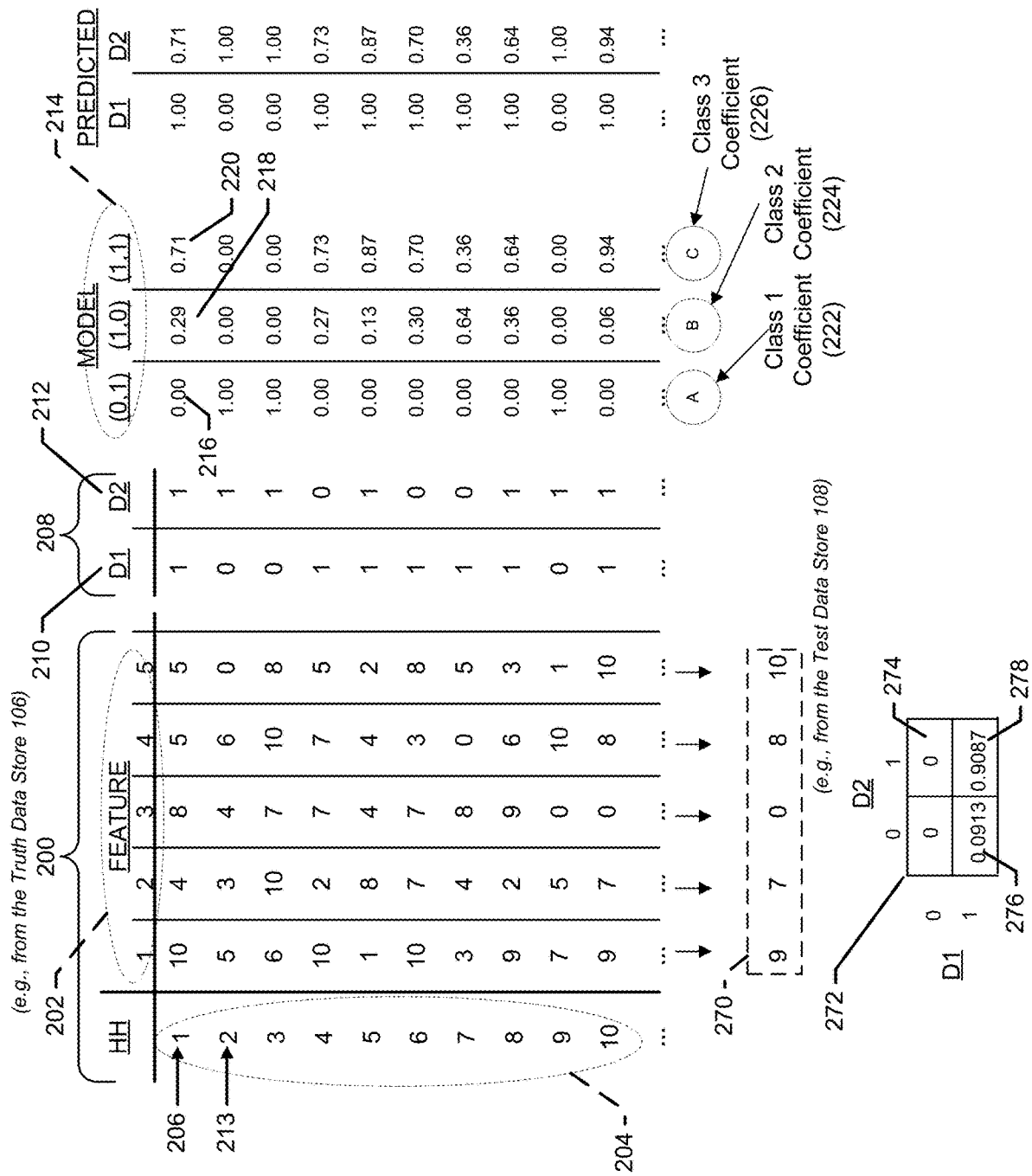
FIG. 2 is an example training data set analyzed by the example demographic modeling system of FIG. 1 to estimate household demographic information with binary demographic indicators.

FIG. 2 illustrates example training data 200 retrieved by the example data retriever 110 (e.g., from the example truth data store 106) and segregated by five (5) example features of interest 202. The example five features of interest 202 may be indicative of five television shows for which tuning data occurred for twenty-five (25) example households 204. For each intersecting household row 204 and feature column 202, an example value of quarter hours of viewing is shown.

For instance, in the illustrated example of FIG. 2, a first household 206 viewed ten (10) quarter hours of feature 1, four (4) quarter hours of feature 2, eight (8) quarter hours of feature 3, five (5) quarter hours of feature 4, and five (5) quarter hours of feature 5.

The example household data associator 114 associates available demographic data 208 with the respective households 204. In the illustrated example of FIG. 2, two demographics are shown as "D1" 210 and "D2" 212. While the illustrated example of FIG. 2 includes 25 households, five features and two demographics of interest, such examples are included for illustration and not limitation. Example disclosed herein may include any number of households, features and/or demographic of interest to improve multi-demographic modeling efficiency. The example demographic data 208 includes values of one (1) or zero (0) to indicate whether the corresponding household included a particular demographic of interest when the feature viewing behavior occurred. Demographic indicators of one (1) reflect the presence of that particular demographic, while demographic indicators of zero (0) indicate no viewing behavior of that particular demographic. For example, the first household 206 includes a value of 1 for demographic D1 and D2 to indicate that household members of these demographics participated in the corresponding viewing behaviors, and a second household 213 includes a value of 0 for demographic D1 to indicate that no household member fitting the qualifications for D1 participated in the corresponding viewing behaviors, while demographic D2 did participate in those viewing behaviors.

As described above, traditional approaches to developing a training model included the application of training data on each demographic of interest individually to generate model coefficients that might be used for projection purposes. When one demographic of interest was modeled to generate corresponding coefficient values, the marketing analyst proceeded to identify the next demographic of interest, apply a corresponding model, and generate corresponding coefficients for that other demographic of interest. After all demographics of interest were modeled and corresponding coefficients were generated, the analyst again applied such training data and coefficients to another model to consider potential effects of collinearity. Accordingly, such traditional approaches included multiple iterations of individualized modeling efforts that each consume processing resources, and analyst micro-management.

Unlike traditional approaches to estimate household demographics to develop a model for predictions and/or projections, examples disclosed herein enumerate unique combinations of participating household demographics in connection with the training data 200. The example class enumerator 116 enumerates each unique demographic combination to a class representation. In the illustrated example of FIG. 2, because there are two separate demographics of interest associated with the training data 200, there are three (3) possible unique combinations. In particular, the example class enumerator 116 creates a first class (Class 1) to identify circumstances in which D1 does not participate in the viewing behavior, but D2 does participate in the viewing behavior. Additionally, the example class enumerator 116 creates a second class (Class 2) to identify circumstances in which D1 participates in the viewing behavior, but D2 does not participate in the viewing behavior. Finally, the example class enumerator 116 creates a third class (Class 3) to identify circumstances in which both D1 and D2 participate in the viewing behavior. Note that examples disclosed herein do not consider circumstances in which neither D1 nor D2 participate in the viewing behavior, as such circumstances do not contribute to the modeling effort.

The example Cartesian combiner 118 assigns Cartesian products of candidate combinations 214, in which coordinates are in a format (D1, D2) having a binary indicator of one (1) or zero (0) to indicate the presence or absence, respectively, of household members associated with demographic D1 and/or D2. In the illustrated example of FIG. 2, the Cartesian combiner 118 assigns (0, 1) as Class 1 to reflect circumstances where D1 does not participate in the viewing behavior, but D2 does participate in the viewing behavior. Additionally, the Cartesian combiner 118 assigns (1, 0) as Class 2 to reflect circumstances where D1 does participate in the viewing behavior, but D2 does not participate in the viewing behavior. Finally, the Cartesian combiner 118 assigns (1, 1) as Class 3 to reflect circumstances where both D1 and D2 participate in the viewing behavior.

The example modeling engine 120 performs a logistic regression of the enumerated class representations to generate probability splits for each class representation. As used herein, application of the logistic regression includes a multinomial regression, which is sometimes referred to herein as a multinomial logistic regression. As shown in the illustrated example of FIG. 2, for each intersecting Cartesian product of candidate combinations 214 and household 204, the example modeling engine 120 generates probability values (e.g., Class 1 probability values, Class 2 probability values and Class 3 probability values). The example first household 206 includes a zero percent probability (see item 216) that the Class 1 combination (that is, no participation by a household member matching demographic D1 and participation by a household member matching demographic D2) occurs, a 29% probability (see item 218) that the Class 2 combination occurs, and a 71% probability (see item 220) that the Class 3 combination occurs. When the example modeling engine 120 applies the logistic regression to the example training data 200 in connection with the enumerated classes 214, corresponding coefficients for each enumerated class of interest result. In the illustrated example of FIG. 2, the modeling engine 120 calculates a Class 1 model coefficient "A" (see item 222), a Class 2 model coefficient "B" (see item 224), and a Class 3 model coefficient "C" (see item 226). Such corresponding coefficients are later used in connection with test data and/or test sets for the purpose of demographic projections with data for which the underlying demographic data is unknown or not otherwise verified as true, as described in further detail below.

To estimate and/or otherwise predict a probability of a demographic of interest participating in a household of interest, the example linear combiner 122 applies linear combinations of the example corresponding class probabilities (e.g., for the example first household 206 the Class 1 probability of 0% (see item 216), the Class 2 probability of 29% (see item 218), and the Class 3 probability of 71% (see item 220) are used). To illustrate, the example linear combiner 122 selects a household of interest (e.g., the first household 206) and a demographic of interest for which a predicted probability value is desired (e.g., demographic D1). Based on the selected demographic of interest, the example linear combiner 122 selects class probability values for only those classes in which demographic D1 has participated. Recalling that the example class Cartesian coordinates are in a binary representation of (D1, D2), then the example linear combiner 122 only selects class probability values that include the demographic of interest (e.g., D1). As such, the example linear combiner 122 selects values associated with Class 2 (29%) and Class 3 (71%) to perform a summation (100%) for the probability that a household member fitting demographic D1 participated in the corresponding viewing behaviors.

In the event that one or more additional demographics of interest for the household of interest are to be evaluated, the example linear combiner 122 selects another demographic of interest (e.g., demographic D2). In this case, only Class 1 (0%) and Class 3 (71%) meet the criteria for activity associated with demographic D2. The example linear combiner 122 performs a summation of these available values to calculate a 71% probability that a household member fitting demographic D2 participated in the corresponding viewing behaviors. When all demographics for the household of interest have been evaluated, the example linear combiner 122 determines if one or more households of interest are to be similarly evaluated, and the aforementioned calculations repeat as described above.

As described above, the model is now trained and ready to be applied to one or more test sets of data to determine predicted probabilities when demographic information associated with viewing behavior is unknown. In some examples, the test sets of data are not associated with rigorous control and management typically associated with panelist data. In some examples, the test sets of data are associated with third party models, the consistency and/or accuracy of which is unknown. Examples disclosed herein evaluate such third party models in view of the training data to, in part, determine whether the third party models are consistent with known truth data and/or determine whether such third party truth models should be ignored, accepted or accepted in part.

While the illustrated example of FIG. 2 included demographic data 208 in which demographic values are a binary indicator (e.g., 0 or 1) indicative of the absence or presence of a demographic of interest, examples disclosed herein are not limited thereto. In some examples, included demographic data may include values indicative of a number of household members of a particular demographic group that participated in the viewing behavior.

FIG. 3 illustrates example training data 300 retrieved by the example data retriever 110 (e.g., from the example truth data store 106) that, similar to the illustrated example of FIG. 2, is segregated by five (5) example features of interest 302. Similar to the illustrated example of FIG. 2, the illustrated example of FIG. 3 includes demographic data 308 with two separate demographic types of interest; "D1" 310 and "D2" 312. However, unlike the binary representation of demographics shown in the illustrated example of FIG. 2, the values associated with the example demographic data 308 of FIG. 3 are indicative of a quantity of members within the respective households that meet the demographic criteria of interest. For example, in an example first household 306, D1 has a value of "1" to indicate one household member fitting the demographic criteria of D1, and D2 has a value of "2" to indicate two household members fitting the demographic criteria of D2.

In the illustrated example of FIG. 3, uniquely occurring combinations of demographic D1 and demographic D2 can include between zero and three household members. As such, there are a total of sixteen possible combinations of household members for D1 and D2 (two demographic values, each with four possible values→$2^4$=16). However, because examples disclosed herein do not consider the combination where zero household members were present for D1 and D2, a total of fifteen (15) combinations exist with the illustrated example of FIG. 3. An example class column 350 enumerates each uniquely occurring combination of D1 and D2 as a separate class, beginning with a designating letter "A" (Class A) to represent circumstances in which household combinations have one member of type D1 and two members of type D2 (e.g., (1, 2)). While the unique combination of Class A only occurs once in the illustrated example of FIG. 3 for the example first household 306, an example Class E occurs five (5) times in household 5, household 10, household 13, household 20 and household 23. In particular, Class E reflects circumstances in which there are three household members that satisfy the demographic criteria of D1 and D2 (e.g., (3, 3)). After considering all unique combinations of D1 and D2 in the illustrated example of FIG. 3, there are thirteen unique combinations (labeled as Class A through Class M). However, considering that there is a potential for fifteen unique combinations of D1 and D2 (in view of zero to three members possible in each demographic of interest), the example data 300 did not include the missing combinations of (2, 1) (e.g., two household members associated with D1 and one household member associated with D2) and (3, 0) (e.g., three household members associated with D1, and no household members associated with D2).

Despite the aforementioned differences regarding binary demographic representations in the illustrated example of FIG. 2, and numeric counts of household members for each demographic of interest in the illustrated example of FIG. 3, the above identified examples to develop a training model may be accomplished in substantially the same manner. With the example model coefficients, such as the example Class 1 model coefficient A (222), the example Class 2 model coefficient B (224), and the example Class 3 model coefficient C (226) of FIG. 2, one or more test sets may be applied thereto.

In operation, the example data retriever 110 retrieves test set data, such as observed behavior data for which corresponding demographic information is unknown. In the illustrated example of FIG. 2, the data retriever 110 retrieved a first test set 270 (e.g., from the example test data store 108) of quarter hours of viewing time of the five (5) features of interest 202. The example modeling engine 120 applies the model, including the example three model coefficients A (222), B (224) and C (226) to derive probability values for each class of interest, as shown in the example test set results matrix 272. The example test set results matrix 272 includes the three classes described above, which includes a Class 1 cell 274, a Class 2 cell 276 and a Class 3 cell 278. While the illustrated example test set results matrix 272 also includes a placeholder for D1=0 and D2=0, such circumstances do not contribute to this analysis because it does not reveal behavior information.

The result of the example modeling engine 120 performing the multinomial regression on the example first test set 270 in connection with the example three model coefficients A (222) (associated with Class 1), B (224) (associated with Class 2) and C (226) (associated with Class 3) are probability values of zero, 0.913 and 0.9087, respectively. As described above, these probability values reflect class probabilities that include component influences from the demographics of interest (D1 and D2). The example class enumerator 116 reverts the classes back to probability values for each demographic of interest by summing the probability values of the test results matrix 272 according to each demographic. In other words, because the classes include two or more individual demographic components together (e.g., as a probability value), the class enumerator 116 reverts those classes into individualized demographic components, each having an associated probability value. For example, cells of the example test results matrix 272 that are associated with D1 behaviors include the Class 2 cell (276) and the Class 3 cell (278). The sum of resulting probability values of these cells adds up to 1.00, which reveals that there is a 100% probability that the test set data 270 behaviors included a household member belonging to demographic D1. Similarly, cells of the test results matrix 272 that are associated with D2 behaviors include the Class 1 cell (274) and the Class 3 cell (278). The sum of resulting probability values of these cells adds up to 0.9087, which reveals that there is a 91% probability that the test set data 270 behaviors included a household member belonging to demographic D2.

As described above, examples disclosed herein also generate models in which a training set includes third party models. For example, Experian® collects information on people, businesses, motor vehicles, insurance and lifestyle data (e.g., via online surveys, offline surveys, social media monitoring, etc.). In some examples, the third party models (e.g., from Experian®) exhibit particular strengths to reveal demographic information associated with particular demographics of interest. However, in some examples, the third party models may not align well or otherwise satisfy statistical requirements to allow predictions, projections and/or estimations.

FIG. 4 illustrates example training data 400 retrieved by the example data retriever 110 that, similar to the illustrated examples of FIGS. 2 and 3, is segregated by five (5) example features of interest 402. Similar to the illustrated examples of FIGS. 2 and 3, the illustrated example of FIG. 4 includes demographic data 408A with two separate demographic types of interest associated with the training data 400; "D1" 410A and "D2" 412A. However, the illustrated example of FIG. 4 also includes a third party model, which includes demographic data 408B with representations of the same two separate demographic types of interest; "D1" 410B and "D2" 412B. In some examples, third party model data may be stored in the example test data store 108.

As described above, the example class enumerator 116 enumerates each unique demographic combination to a class representation, and the example Cartesian combiner 118 assigns Cartesian products of candidate combinations. In the illustrated example of FIG. 4, nine (9) separate Cartesian products of candidate combinations 414 are shown having coordinates in a format (D1, D2) with a binary indicator of one (1) or zero (0) to indicate the presence or absence, respectively, of household members associated with demographic D1 and/or D2. Additionally, because the illustrated example of FIG. 4 considers a comparison to a third party model, Cartesian coordinate intersections of interest between the truth model and the third party model are analyzed. For example, a first intersecting column of interest 450 includes an intersection of the third party model in which D1 does not participate and D2 does participate in the viewing behavior (0, 1) with the truth model in which D1 does not participate and D2 does participate with the viewing behavior (0, 1). Taken together, the first intersecting column of interest 450 is shown as "(0, 1) (0, 1)." Additional columns of interest are shown in the illustrated example of FIG. 4 for the remaining candidate combinations of interest between the truth model and the third party model, and there are nine (9) columns in total because circumstances where there is no viewing behavior for D1 and D2 are not considered in this analysis (e.g., (0, 0) (0, 1), (0, 0) (1, 0), (1, 1) (0, 0), etc.).

As described above, the example modeling engine 120 performs a multinomial logistic regression of the enumerated class representations in connection with the training data 400 and the third party model to generate probability splits for each class representation. In the illustrated example of FIG. 4, the modeling engine 120 calculates a 53% probability that the combination (0, 1) (0, 1) occurs in connection with the associated training data 400. In other words, there is a 53% probability that (a) the third party model predicts that zero household members associated with D1 and one household member associated with D2 participate in the viewing behavior and (b) the truth model predicts the same.

In addition to calculating probability values for the class intersections, the example modeling engine 120 also calculates coefficients for each class of interest to be used for estimations in the event one or more test data sets are obtained. However, examples disclosed herein also reveal valuable information related to the third party model regarding its ability to accurately predict particular types of demographic behavior. As described above, the example linear combiner 122 applies linear combinations of the calculated class probabilities to estimate a likelihood that a particular demographic is present. In the illustrated example of FIG. 4, results of demographic likelihoods for the third party model and the truth model 452 are shown. These example results 452 illustrate particular strengths or weaknesses of the third party model for predicting demographic behaviors for particular demographics of interest. For example, an example second household 413 illustrates that the modeling engine 120 and linear combiner 122 have calculated the third party model to predict a 69% probability for D1 and a 61% probability for D2. Additionally, the example modeling engine 120 and the linear combiner 122 have calculated the truth model to predict a 71% probability for D1 and a 63% probability for D2. The example linear combiner 122 compares these predictions to determine difference values and, in this case, the two models differ by 2% for D1 and 2% for D2. In some examples, the linear combiner 122 compares these differences to a threshold value that, when satisfied (e.g., exceeded), generates a flag to warn against and/or otherwise prevent the third party model from being relied upon for model correction or use. In other words, the example linear combiner 122 facilitates an ability to generate a trust metric for the third party model.

To illustrate, consider an example fourth household 454 that illustrates the third party model predicts a 57% probability for D1, while the truth model predicts a 25% probability for D1. In this example, the third party model overpredicted demographic D1 by 32%. In the event a difference threshold were established at, for example, 10%, then the example linear combiner 122 would flag the third party model as unreliable for these circumstances.

However, in some examples additional information associated with the third party model is available to reveal that a particular demographic combination was empirically observed. In the event that the third party model also includes observation data (e.g., empirical observation data) for a particular demographic combination (e.g., D1=1, D2=0), then the example modeling engine 120 adjusts the truth model to align closer to the third party model (e.g., weighting).

While an example manner of implementing the demographic modeling system 100 of FIG. 1 is illustrated in FIG. 1, one or more of the elements, processes and/or devices illustrated in FIG. 1 may be combined, divided, re-arranged, omitted, eliminated and/or implemented in any other way. Further, the example truth data store 104, the example test data store 106, the example data retriever 110, the example feature set segregator 112, the example household data associator 114, the example class enumerator 116, the example Cartesian combiner 118, the example modeling engine 120, the example linear combiner 122, the example condition engine 124 and/or, more generally, the example demographic modeling manager 102 of FIG. 1 may be implemented by hardware, software, firmware and/or any combination of hardware, software and/or firmware. Thus, for example, any of the example truth data store 104, the example test data store 106, the example data retriever 110, the example feature set segregator 112, the example household data associator 114, the example class enumerator 116, the example Cartesian combiner 118, the example modeling engine 120, the example linear combiner 122, the example condition engine 124 and/or, more generally, the example demographic modeling manager 102 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example truth data store 104, the example test data store 106, the example data retriever 110, the example feature set segregator 112, the example household data associator 114, the example class enumerator 116, the example Cartesian combiner 118, the example modeling engine 120, the example linear combiner 122, the example condition engine 124 and/or, more generally, the example demographic modeling manager 102 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example demographic modeling system 100 of FIG. 1 may include one or more elements, processes and/or devices in addition to, or instead of, those illustrated in FIG. 1, and/or may include more than one of any or all of the illustrated elements, processes and devices.

Flowcharts representative of example machine readable instructions for implementing the demographic modeling system 100 of FIG. 1 are shown in FIGS. 5-8. In these examples, the machine readable instructions comprise a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 5-8, many other methods of implementing the example demographic modeling system 100 may alternatively be used. For example, the order of execution of the blocks may be changed, and/or some of the blocks described may be changed, eliminated, or combined.

As mentioned above, the example processes of FIGS. 5-8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 5:
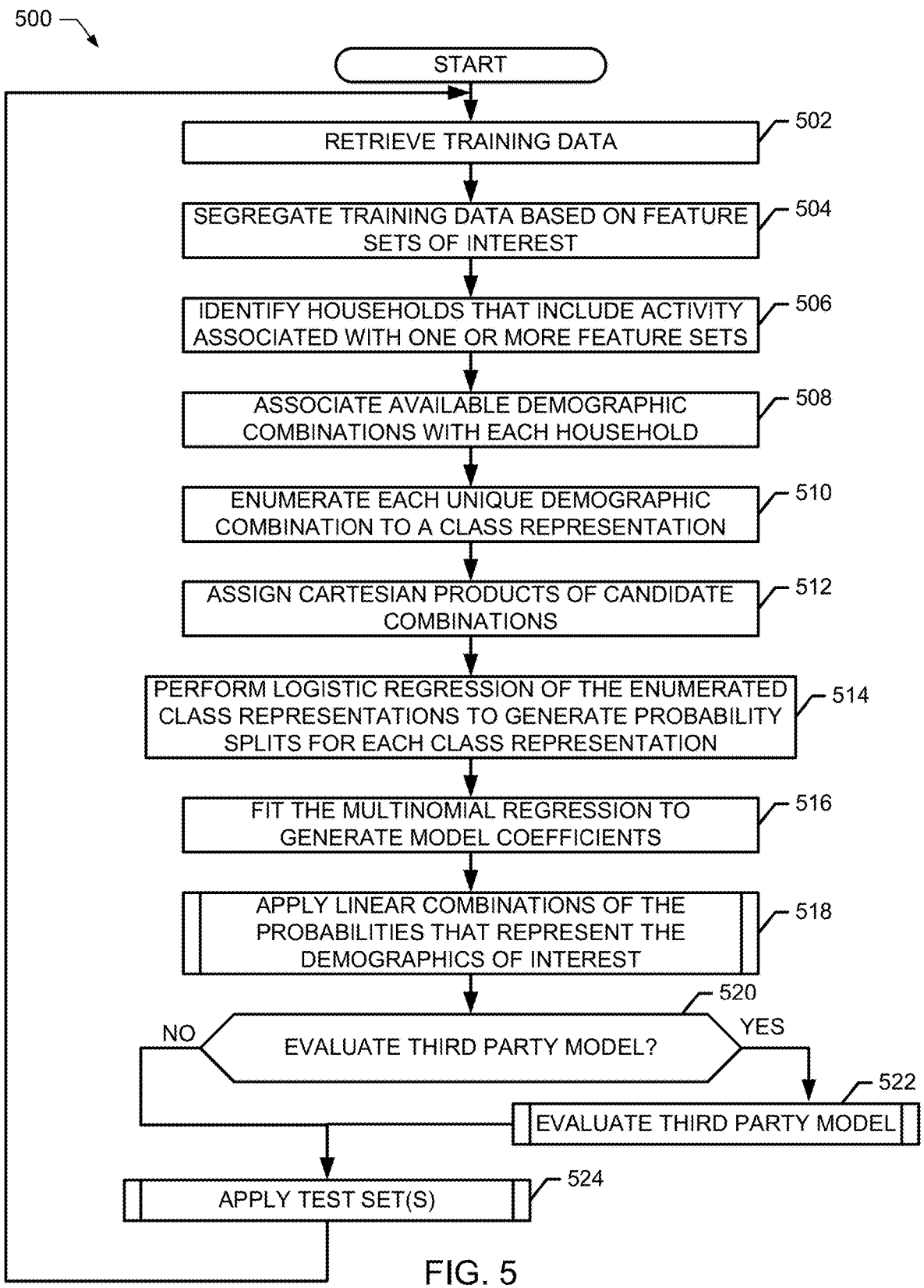
FIGS. 5-8 are flowcharts representative of example machine readable instructions that may be executed to implement the example demographic modeling system and/or the example demographic modeling manager of FIG. 1 to improve multi-demographic modeling efficiency.

The program 500 of FIG. 5 begins at block 502, where the example data retriever 110 retrieves and/or otherwise receives training data from the example truth data store 106. Depending on the number and/or type of features of interest to be analyzed, the example feature set segregator 112 segregates the retrieved training data based on those feature sets of interest (block 504). In some examples, one or more feature sets are selected to help reveal audience behavior(s) and/or trends related to broadcast assets, such as particular television shows or particular commercials, etc. For example, the marketing analyst and/or a client of the marketing analyst may be interested in learning about which demographic household members tend to consume and/or otherwise view the particular television programs broadcast on media devices to a greater or lesser degree. For those particular programs (e.g., features), the example feature set segregator 112 identifies particular households from the training set that include viewing activity associated with the feature sets of interest, and includes viewing data associated therewith (block 506). As such, the viewing data to be included in the analysis is focused on (a) the feature(s) of interest and (b) the viewing data for which those features have occurred. In some examples, the viewing data includes a number of quarter-hours of viewing time, as shown in FIGS. 2-4.

The segregated viewing data from the example truth data store 106 is panelist data that also includes verified and/or otherwise true demographic information. The example household data associator 114 associates available demographic data with each household of interest (block 508), which is shown as item 208 in FIG. 2. The example class enumerator 116 enumerates each unique demographic combination to a class representation (block 510). For example, a combination of a household member associated with demographic D1 not viewing and a household member associated with demographic D2 viewing is enumerated as "Class 1." As another example, a combination of a household member associated with demographic D1 viewing and another household member associated with demographic D2 viewing is enumerated as "Class 3." The enumerated classes are assigned, by the example Cartesian combiner 118, Cartesian product representations of candidate combinations (block 512). Examples of such enumerated assignments are shown as item 214 of FIG. 2.

The example modeling engine 120 performs a conditional maximum entropy modeling of the truth data and enumerated combinations by performing a logistic regression (e.g., a multinomial logistic regression) of the enumerated class representations (block 514). In particular, the example modeling engine 120 generates probability splits for each class representation for all participating households, and verifies that all household probability values add up to 100%. Additionally, the example modeling engine 120 fits the multinomial regression to generate model coefficients associated with each unique enumerated class (block 516), such as the example Class 1 model coefficient "A" (222), the example Class 2 model coefficient "B" (224), and the example Class 3 model coefficient "C" (226) described above in connection with FIG. 2. As described above and in further detail below, the example model coefficients may be used when generating estimates in connection with test sets of data for which demographic information is unknown.

While the example model class probabilities resulted from the application of the multinomial regression, such probabilities are not yet in terms of the demographic of interest, but rather two or more demographic combinations that may have occurred with the training (truth) data set (e.g., the example training data 200 of FIG. 2, the example training data 300 of FIG. 3, the example training data 400 of FIG. 4, etc.). To estimate the likelihood that a particular demographic is present, the example linear combiner 122 applies linear combinations of the class probabilities that represent a target demographic of interest (block 518).

Figure 6:
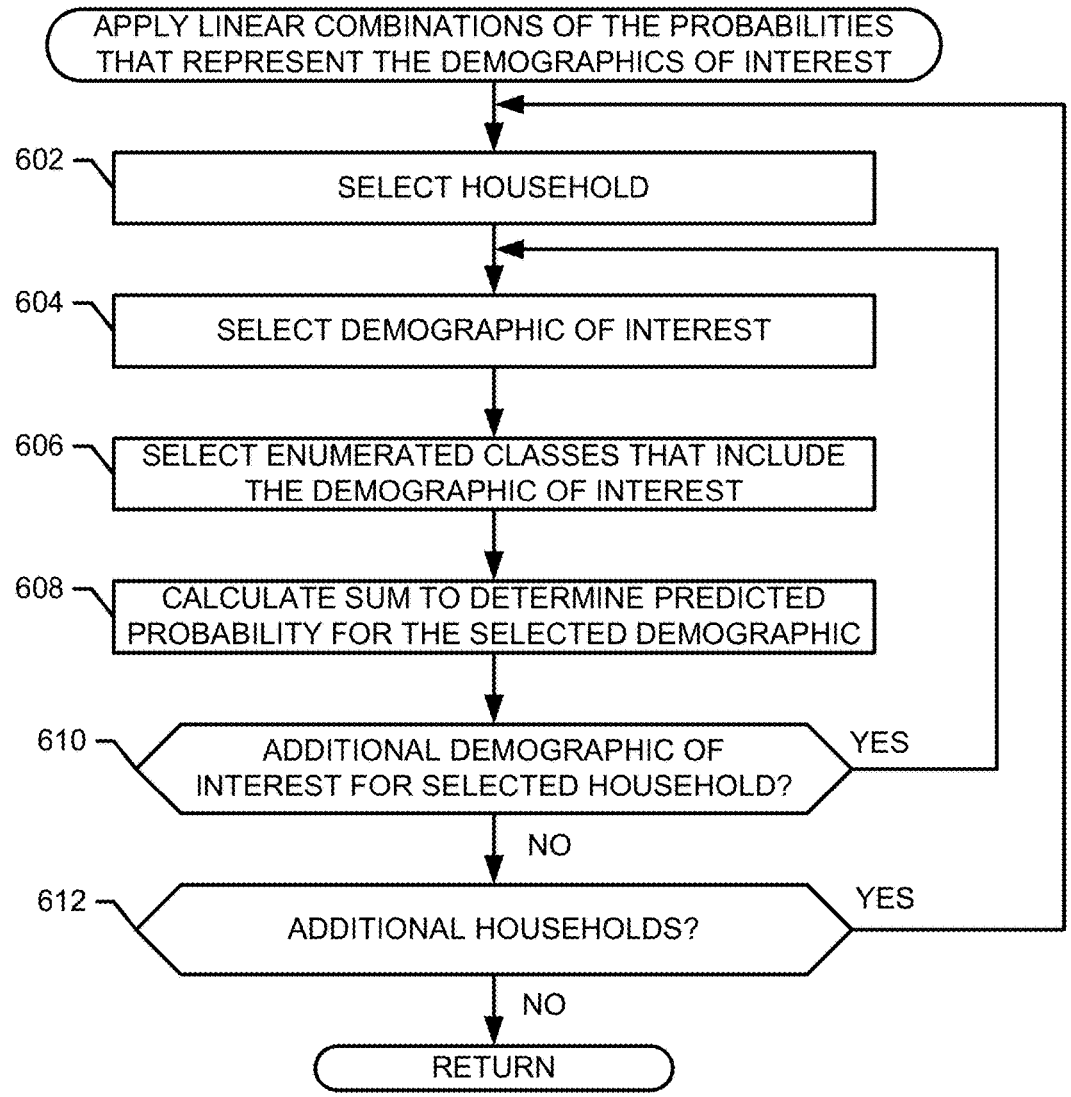

FIG. 6 illustrates additional detail in connection with applying a linear combination of interest of block 518. In the illustrated example of FIG. 6, the example linear combiner 122 selects a household of interest (block 602) having associated class probability values. To illustrate, examples from FIG. 2 are described, but similar processes may be applied to the illustrated examples of FIGS. 3 and/or 4. Assuming for this example that a predicted probability for demographic D1 is desired (block 604), the linear combiner 122 selects values from only those enumerated classes in which D1 occurs (block 606). For example, Class 1 includes a Cartesian representation (0, 1), Class 2 includes a Cartesian representation (1, 0), and Class 3 includes a Cartesian representation (1, 1). For each example Cartesian representation, the first value reflects the occurrence or non-occurrence of demographic D1, and the second value reflects the occurrence or non-occurrence of demographic D2. For the sake of this example, in which D1 is the target demographic of interest, the example linear combiner 122 selects only Class 2 and Class 3 because they each include potential behavior data associated with D1 (e.g., those classes include a value of "1" in the Cartesian representation for D1). In the illustrated example of FIG. 2, the sum of the values for Class 2 (0.29) and Class 3 (0.71) is 1.00, which reflects a 100% probability that a household member associated with D1 participated in the activity (e.g., viewing behavior).

Values for those classes of interest are summed (block 608) to yield a predicted probability for the demographic of interest. The example linear combiner 122 determines whether an additional demographic of interest is available for the selected household (block 610). If so, control returns to block 604 to select an alternate/additional demographic of interest. If not, then the linear combiner 122 determines whether there are additional households left to evaluate (block 612). If so, then control returns to block 602, otherwise the example program 518 ends and control returns to block 520 of FIG. 5.

As described above, after the training data has been modeled to generate coefficients associated with each unique enumerated class of demographic combinations, one or more test sets of data may be applied to the model to estimate corresponding demographic probabilities associated with those test set(s). In some examples, a test set may include viewing behavior for features of interest, such as quantities of viewed quarter hours of particular television shows. In some examples, application of the test set occurs after the training data has been modeled in connection with a third party model, as shown in the illustrated example of FIG. 4. In some examples, it is desired to determine whether the third party model can be trusted, which may include determining particular demographics of interest that the third party model estimates relatively well as opposed to particular demographics of interest that the third party model does not estimate well.

Figure 7:
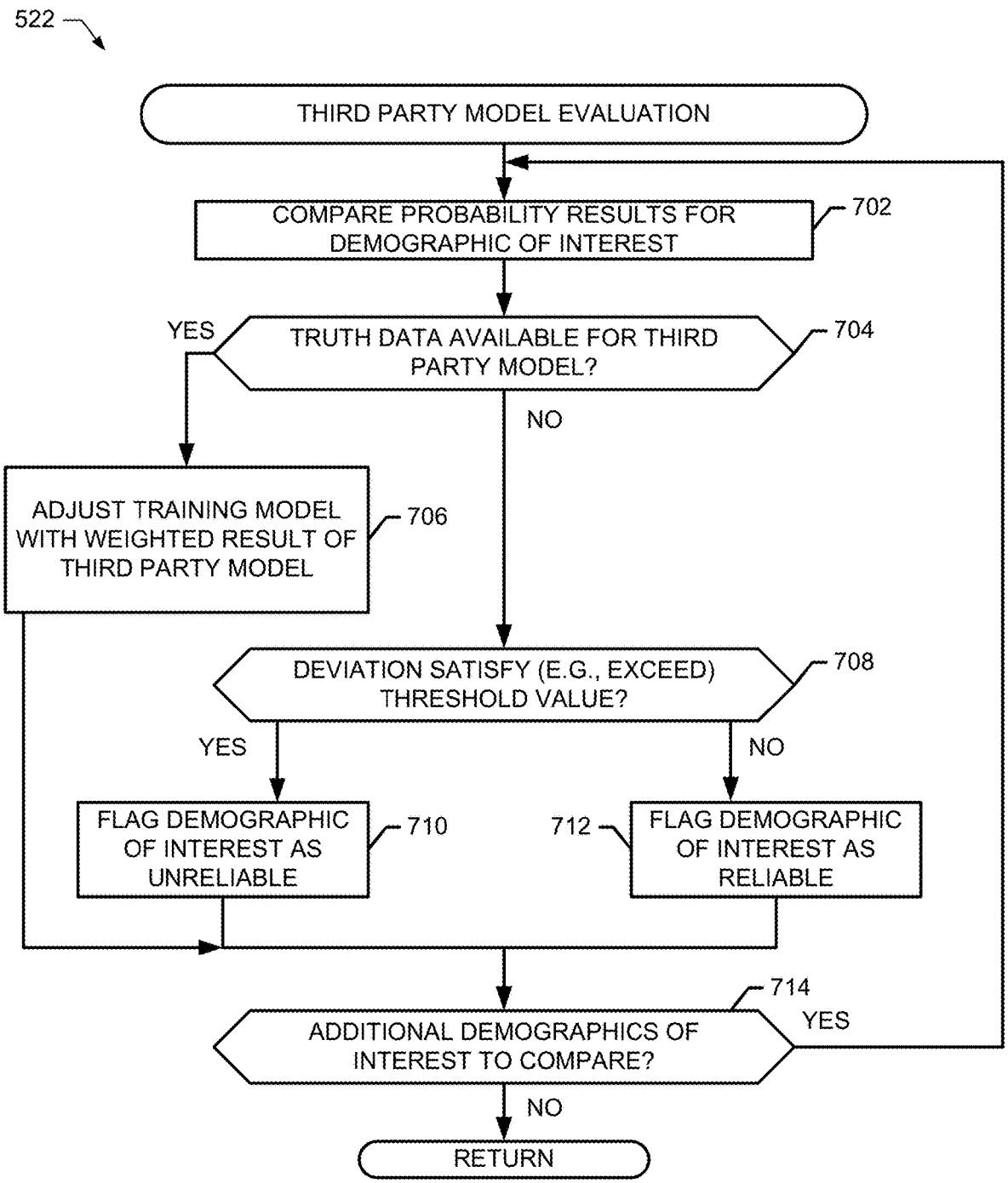

The example demographic modeling manager 102 determines whether to evaluate a third party model (block 520) and, if so, the example modeling engine evaluates the third party model (block 522) on a demographic-by-demographic basis to ascertain how well or how poorly it performs when compared to the truth model (which is based on panelist-based training data). FIG. 7 illustrates additional detail to evaluate the third party model in connection with block 522. In the illustrated example of FIG. 7, the example linear combiner 122 compares probability results between the third party model and the training model for demographic of interest (block 702). Depending on whether the third party model also has actual (e.g., empirical) data associated with the demographic of interest, examples disclosed herein will either use the third party model results to help correct the training model or not. The example data retriever 110 determines whether actual truth data is available from the third party model for the demographic of interest (block 704) and, if so, the example modeling engine 120 adjusts the training model with a weighted result of the probability result of the third party model (block 706). In some examples, the weighted result is based on the probability difference value between the third party model and the training model.

On the other hand, if there is no trust data available from the third party model associated with the demographic of interest (block 704), then the example linear combiner determines whether the deviation (difference) satisfies (e.g., exceeds) a threshold value (block 708). In some examples, if the difference in probability values estimated by the third party model and the training model exceeds the threshold (e.g., 10%), then the third party model validity and/or capability is deemed less reliable (block 710). However, if the difference in probability values (for the demographic of interest) estimated by the third party model and the training model does not exceed the threshold (block 708), then the example modeling engine 120 flags the third party model as reliable (block 712). The linear combiner determines whether additional demographics of interest are to be compared (block 714) and, if so, control returns to block 702.

Figure 8:
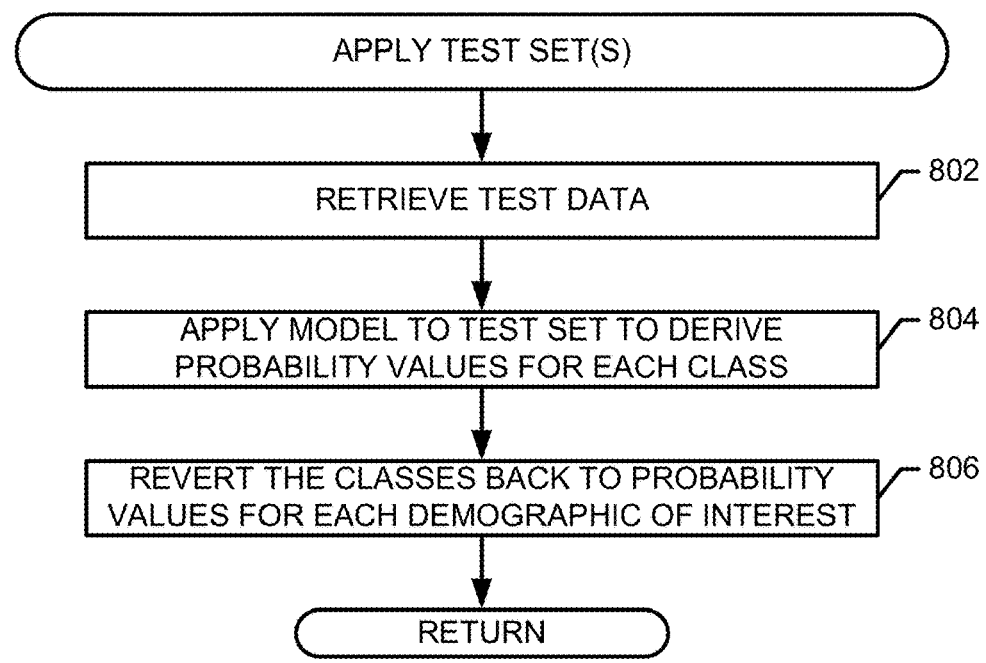

Returning to the illustrated example of FIG. 5, if there is no third party model to be evaluated (block 520), or after such a third party model has been evaluated (block 522), the example demographic modeling manager 102 applies one or more test sets of data to the training model (block 524). FIG. 8 illustrates additional detail of applying test sets in connection with block 524. In the illustrated example of FIG. 8, the example data retriever 110 retrieves test data (block 802), such as the example first test set 270 of quarter hours of viewing time shown in FIG. 2. The example modeling engine 120 applies the training model (e.g., the example Class 1 coefficient "A" 222, the example Class 2 coefficient "B" 224, and the example Class 3 coefficient "C" 226 of FIG. 2) to the test set to derive probability values for each class (block 804). As described above, classes include combinations of demographic members that can later be reverted to individualized demographic probabilities. The example class enumerator 116 reverts the estimated class probabilities back to individualized demographic probabilities for each demographic of interest (block 806). Control then returns to the illustrated example of FIG. 5 where the process 500 can repeat, as desired.

Figure 9:
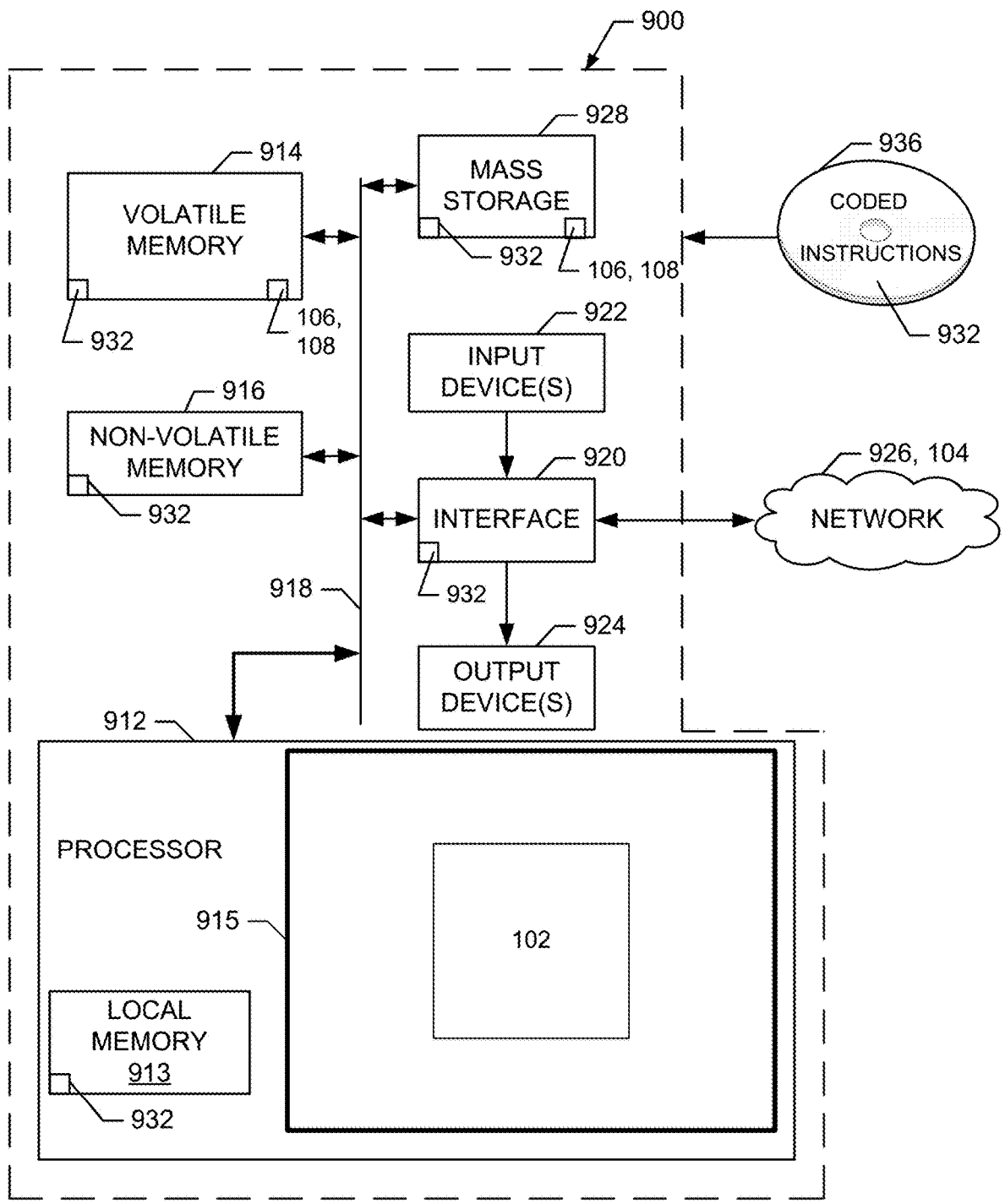
FIG. 9 is a block diagram of an example processor platform structured to execute the example machine readable instructions of FIGS. 5-8 to implement the example demographic modeling system of FIG. 1.

FIG. 9 is a block diagram of an example processor platform 900 capable of executing the instructions of FIGS. 5-8 to implement the demographic modeling system 100 of FIG. 1. The processor platform 900 can be, for example, a server, a personal computer, a mobile device (e.g., a cell phone, a smart phone, a tablet such as an iPad™), a personal digital assistant (PDA), an Internet appliance, a gaming console, a set top box, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. In the illustrated example of FIG. 9, the processor 900 includes one or more example processing cores 915 configured via example instructions 932, which include the example instructions of FIGS. 5-8 to implement the example demographic modeling system 100 of FIG. 1.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives. In some examples, the mass storage device may implement the example truth data store 106 and/or the example test data store 108.

The coded instructions 932 of FIGS. 5-8 may be stored in the mass storage device 928, in the volatile memory 914, in the non-volatile memory 916, and/or on a removable tangible computer readable storage medium such as a CD or DVD.

From the foregoing, it will be appreciated that the above disclosed methods, apparatus and articles of manufacture improve the efficiency when modeling multiple demographics of interest from training data so that estimates may be generated from one or more test sets of data. In particular, traditional approaches to model a first demographic of interest include a first modeling iteration in view of only that particular demographic of interest. Once that modeling effort has been completed, a subsequent modeling effort (e.g., using the same training data) is performed on the alternate demographic of interest. This process repeats for all demographics of interest that are of interest and, when corresponding coefficients for the demographics of interest have been calculated (e.g., fitted), further modeling efforts must be applied to compensate for potential modeling errors caused by co-linearity. However, examples disclosed herein reduce (e.g., minimize) a number of modeling iterations for training data in which two or more demographics of interest are to be estimated. Additionally, examples disclosed herein reduce modeling errors in connection with reliance upon third party models, in which particular estimation and/or prediction capabilities are unknown. Despite an analyst belief or "word of mouth" that a particular third party model is helpful for demographic research, overreliance on such models when they fail to produce accurate estimates causes wasted research efforts and computational waste.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to reduce computational resources for a multi-demographic training model, comprising:
    a feature set aggregator to:
        segregate training data based on feature sets of interest; and
        identify households that participate in at least one of the feature sets of interest;
    a class enumerator to reduce multi-demographic model iterations by enumerating demographic combinations for the identified households, the enumerated demographic combinations including a single identifier to represent a combination of two or more demographic categories;
    a linear combiner to:
        select a demographic category of interest from the two or more demographic categories;
        discriminate which ones of the enumerated demographic combinations are to be selected based on whether the selected demographic category of interest is present therein; and
        when the selected demographic category of interest is present, select the respective ones of the enumerated demographic combinations based on the single identifier, the single identifier including cartesian representations that reflect occurrences or non-occurrences of the selected demographic category of interest; and
    a modeling engine to generate training coefficients corresponding to the selected ones of the enumerated demographic combinations.

2. The apparatus as defined in claim 1, further including a household data associator to associate demographic combinations with respective ones of the identified households.

3. The apparatus as defined in claim 1, wherein the modeling engine is to perform a multinomial logistic regression with the segregated training data and the selected ones of the enumerated demographic combinations to generate the training coefficients.

4. The apparatus as defined in claim 1, wherein the modeling engine is to generate probability values for the selected ones of the enumerated demographic combinations.

5. The apparatus as defined in claim 4, wherein the linear combiner is to revert the probability values for respective ones of the enumerated demographic combinations to probability values associated with individual demographic components.

6. The apparatus as defined in claim 1, further including a data retriever to retrieve a third party model, the modeling engine to generate probability values based on the segregated training data for the selected ones of the enumerated demographic combinations associated with (a) a training model and (b) the third party model.

7. The apparatus as defined in claim 6, wherein the linear combiner is to determine probability value differences between the training model and the third party model.

8. The apparatus as defined in claim 7, wherein the linear combiner is to compare the probability value differences to a threshold to determine a trust metric for the third party model.

9. A computer-implemented method to reduce computational resources for a multi-demographic training model, the method comprising:
    segregating, by executing an instruction with a processor, training data based on feature sets of interest;
    identifying, by executing an instruction with the processor, households that participate in at least one of the feature sets of interest;
    reducing, by executing an instruction with the processor, multi-demographic model iterations by enumerating demographic combinations for the identified households, the enumerated demographic combinations including a single identifier to represent a combination of two or more demographic categories;
    selecting a demographic category of interest from the two or more demographic categories;

discriminating which ones of the enumerated demographic combinations to select based on whether the selected demographic category of interest is present therein;

when the selected demographic category of interest is present, selecting respective ones of the enumerated demographic combinations based on the single identifier, the single identifier including cartesian representations that reflect occurrences or non-occurrences of the selected demographic category of interest; and generating, by executing an instruction with the processor, training coefficients corresponding to the selected ones of the enumerated demographic combinations.

10. A method as defined in claim 9, further including associating demographic combinations with respective ones of the identified households.

11. A method as defined in claim 9, further including performing a multinomial logistic regression with the segregated training data and the selected ones of the enumerated demographic combinations to generate the training coefficients.

12. A method as defined in claim 9, further including generating probability values for the selected ones of the enumerated demographic combinations.

13. A method as defined in claim 12, further including reverting the probability values for respective ones of the enumerated demographic combinations to probability values associated with individual demographic components.

14. A method as defined in claim 9, further including retrieving a third party model, and wherein the generating probability values is based on the segregated training data for the selected ones of the enumerated demographic combinations associated with (a) a training model and (b) the third party model.

15. A method as defined in claim 14, further including determining probability value differences between the training model and the third party model.

16. A method as defined in claim 15, further including comparing the probability value differences to a threshold to determine a trust metric for the third party model.

17. A tangible computer-readable storage medium comprising instructions that, when executed, cause a processor to, at least:

segregate training data based on feature sets of interest;

identify households that participate in at least one of the feature sets of interest;

reduce multi-demographic model iterations by enumerating demographic combinations for the identified households, the enumerated demographic combinations including a single identifier to represent a combination of two or more demographic categories;

select a demographic category of interest from the two or more demographic categories;

discriminate which ones of the enumerated demographic combinations to select based on whether the selected demographic category of interest is present therein;

when the selected demographic category of interest is present, select respective ones of the enumerated demographic combination based on the single identifier, the single identifier including cartesian representations that reflect occurrences or non-occurrences of the selected demographic category of interest; and generate training coefficients corresponding to the selected ones of the enumerated demographic combinations.

18. The computer-readable medium as defined in claim 17 including instructions that, when executed, cause the processor to associate demographic combinations with respective ones of the identified households.

19. The computer-readable medium as defined in claim 17 including instructions that, when executed, cause the processor to perform a multinomial logistic regression with the segregated training data and the selected ones of the enumerated demographic combinations to generate the training coefficients.

20. The computer-readable medium as defined in claim 17 including instructions that, when executed, cause the processor to generate probability values for the selected ones of the enumerated demographic combinations.

\* \* \* \* \*